W. G. WILSON.
MAGNETICALLY OPERATED CONVEYING AND DISCHARGING APPARATUS.
APPLICATION FILED AUG. 29, 1911.
1,071,847.
Patented Sept. 2, 1913.
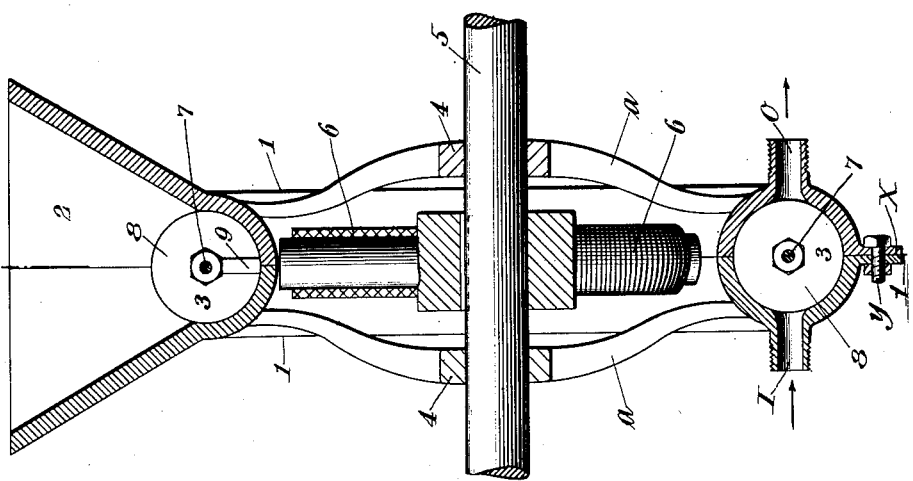
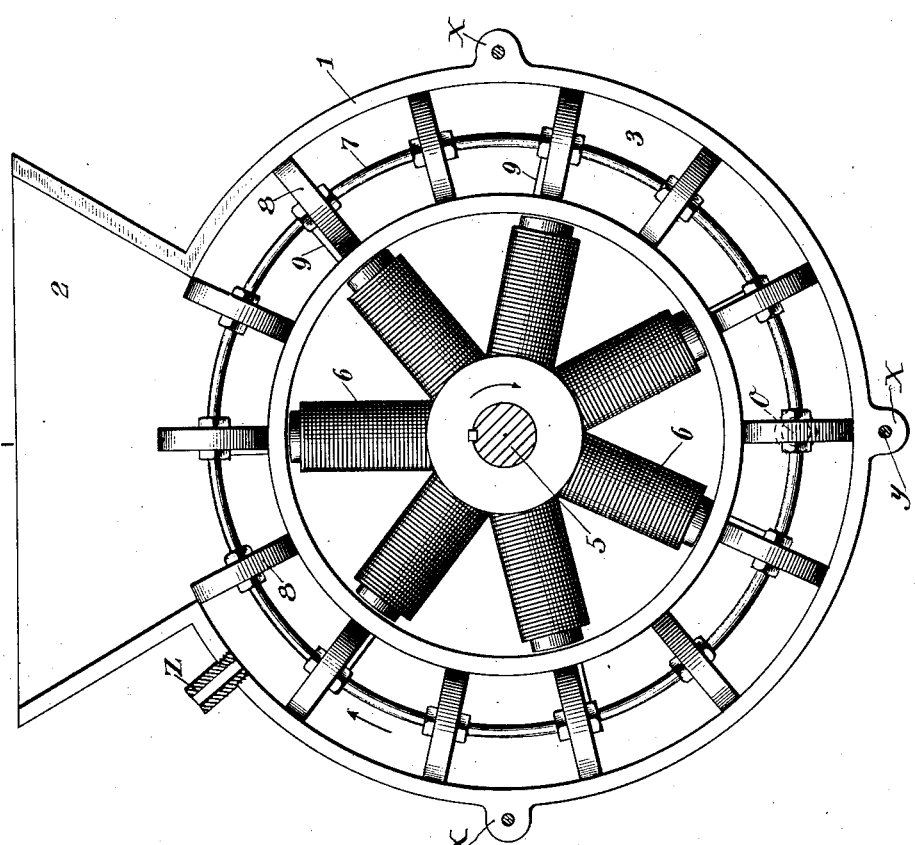

UNITED STATES PATENT OFFICE.

WYLIE GEMMEL WILSON, OF ELIZABETH, NEW JERSEY, ASSIGNOR TO W. G. WILSON COMPANY, OF MONTCLAIR, NEW JERSEY, A CORPORATION OF NEW JERSEY.

MAGNETICALLY-OPERATED CONVEYING AND DISCHARGING APPARATUS.

1,071,847. Specification of Letters Patent. Patented Sept. 2, 1913.

Application filed August 29, 1911. Serial No. 646,677.

*To all whom it may concern:*

Be it known that I, WYLIE GEMMEL WILSON, a subject of the King of Great Britain, residing at Elizabeth, in the county of Union and State of New Jersey, have invented certain new and useful Improvements in Magnetically-Operated Conveying and Discharging Apparatus, of which the following is a specification, reference being had therein to the accompanying drawings.

This invention relates to an apparatus for conveying concrete aggregates or other material from a hopper or other source of supply in continuous batches, into the path of a fluid current whereby the material is discharged out of the apparatus. The conveyer of the apparatus shown is magnetically operated.

This apparatus is useful in so-called "concrete-gun" outfits and generally in connection with apparatus adapted to apply mixed materials through distributing nozzles.

In the accompanying drawings, Figure 1 is a vertical view of one of the two halves of the conveyer casing provided with a magnetically-operated endless-conveyer, and showing the rotatable magnets in elevation, the shaft therefor being in section at the line corresponding to line 1—1 of Fig. 2. Fig. 2 is mainly a vertical sectional elevation of what is shown in Fig. 1, at line 2—2 thereof.

In the drawings, the conveyer casing is preferably made up of two halves provided with perforated lugs $x$ clamped tightly together by suitable bolts $y$. This casing is formed with an upper hopper portion 2, and with an annular cylindrical chamber 3 with which the lower end of the hopper communicates. The hopper is only one of many means for supplying material to the endless cylindrical chamber 3. The casing members 1, 1 are provided with opposite bearings 4, 4 for a rotatable shaft 5 on which is fixed a series of magnets 6 adapted to be rotated within the central space of the casing, the bearings 4, 4 being carried by the spider arms $a$, $a$ of the complementary casing members 1, 1. The chamber 3, which may be called the conveyer chamber, contains an endless conveyer comprised of a ring 7 on which at intervals are fixed disk pistons 8 of a diameter to cause them to fit snugly in the annular and cylindrical chamber 3.

The ring 7 also carries at intervals suitable soft iron pieces 9, in this case fixed directly against the sides of the disk pistons 8. When shaft 5 is rotated, for example, in the direction of the arrow shown in Fig. 1, the ring 7 with the pistons 8 and soft iron pieces 9 will be moved in the direction shown by another arrow in Fig. 1, in consequence of the pull exerted by the magnets on the soft iron pieces; consequently material supplied to hopper 2 will fall into the spaces between the disk pistons in batches and be carried from the bottom of the hopper around within the chamber 3. The casing is provided with a vent $z$ adjacent to that side of the hopper which is approached by the traveling disks so that if there be any compressed air or other fluid in the moving pockets, the same will escape through the vent before it reaches the bottom of the hopper where, if it were suddenly released, it would tend to blow the material upwardly or out of the hopper or other source of supply to the conveyer chamber 3. In the form shown, the casing is provided with opposite ports 1 and O at its lower portion, and when a space between two adjacent piston disks is brought between these ports I and O the material therein may be expelled from the casing by any fluid current under suitable pressure entering one of the ports and blowing transversely through the carrier chamber 3 and passing out of the other port.

I may be considered the inlet port and O the outlet or discharge port. These ports are conveniently formed of screw-threaded tubular projections adapted for a connection, one with a conduit from a compressed-air reservoir, a source of water under head, or a source of steam supply; and the other with a line of hose having a suitable discharge nozzle at its outer end. Such nozzle may be of any desired form,—in some cases the outlet tubular projection O may itself be used for the discharge of material at the place of desired deposit.

The discharging means above described are in effect the same as shown in my copending application, Ser. No. 636,501, and in my copending application, Ser. No. 646,674, I show and claim an air vent positioned at the side of the hopper from which the empty pockets enter.

What I claim, is:

An annular chambered conveyer casing having an inner circumferential wall of magnetic conductivity, an endless conveyer mounted in said annular chamber and provided with pocket-forming disks and soft iron pieces; and a rotatable magnet structure mounted in the space inclosed by the inner circumferential wall of the annular chamber.

In testimony whereof I affix my signature in presence of two witnesses.

WYLIE GEMMEL WILSON.

Witnesses:
　EDWARD E. BLACK,
　F. E. NARES.